Oct. 12, 1943.　　　　　H. A. HOKE　　　　2,331,780
BUILT-UP WHEEL
Original Filed May 3, 1940　　2 Sheets-Sheet 1

WITNESSES:
Hubert Fuchs
Thomas W. Kerr Jr.

INVENTOR:
Harry A. Hoke,
BY Paul & Paul
ATTORNEYS.

Oct. 12, 1943.  H. A. HOKE  2,331,780
BUILT-UP WHEEL
Original Filed May 3, 1940  2 Sheets-Sheet 2
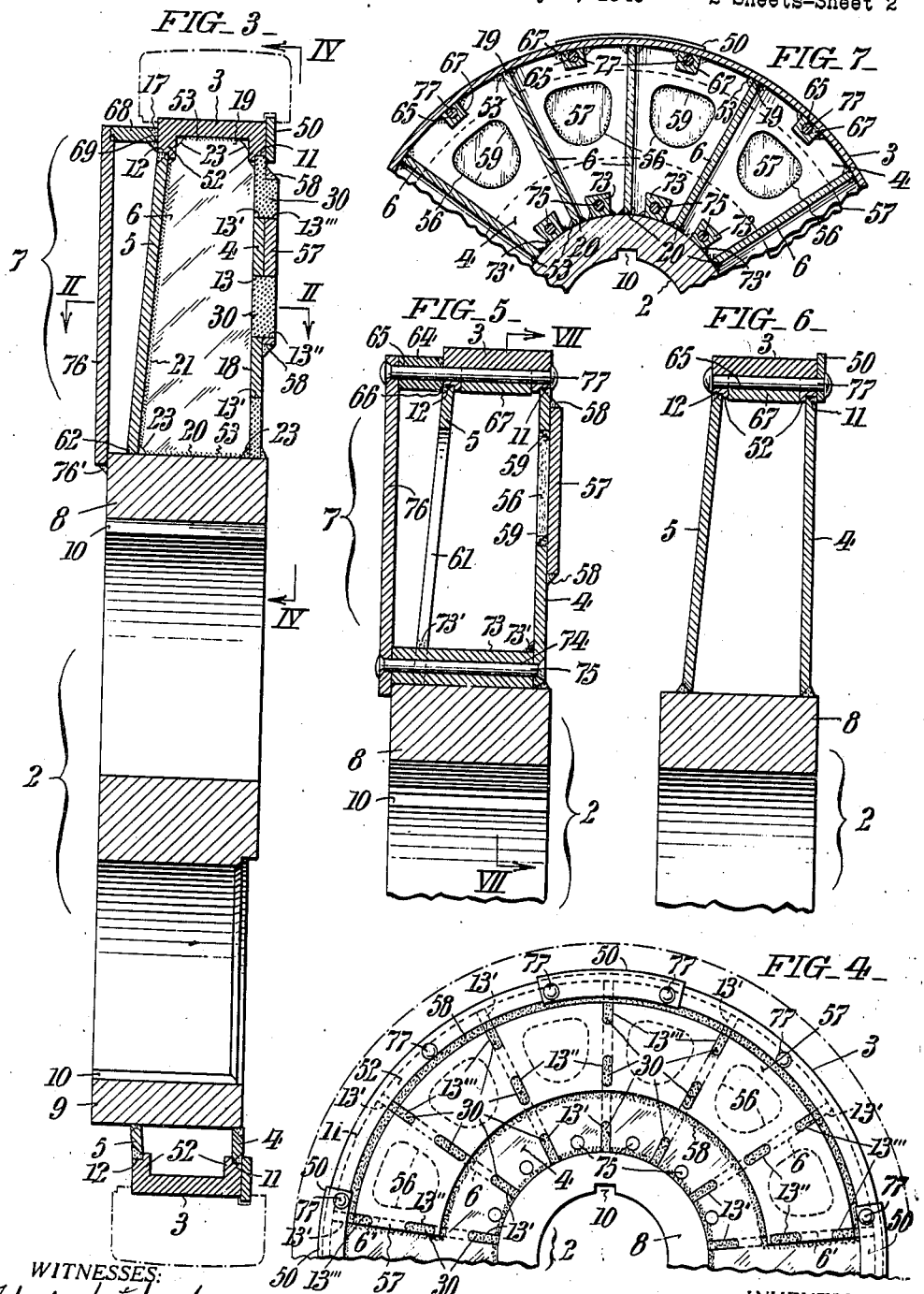
WITNESSES:
Hubert Fuchs
Thomas W. Kerr Jr.
INVENTOR:
Harry A. Hoke,
BY
Paul & Paul
ATTORNEYS Patented Oct. 12, 1943

2,331,780

UNITED STATES PATENT OFFICE 2,331,780

BUILT-UP WHEEL

Harry A. Hoke, Altoona, Pa., assignor to The Pennsylvania Railroad Company, Philadelphia, Pa., a corporation of Pennsylvania Original application May 3, 1940, Serial No. 333,095. Divided and this application September 30, 1941, Serial No. 412,919

4 Claims. (Cl. 295—22)

This invention has general reference to built-up wheels and, more particularly, to locomotive and railroad car wheels of the species comprising a combined axle and crank pin center, and a rim supporting and load carrying flanges connected to said center, with or without a counterbalance pocket preferably exterior to one of the flanges, and all of said parts welded together to form a composite wheel. Specifically, the present invention is a "division" from application, Serial No. 333,095, filed May 3, 1940, by the present applicant for an improvement in Built-up wheels, and allowed August 1, 1941, now matured into Patent Number 2,274,545, issued February 24, 1942.

The primary object of the present invention is to provide a composite wheel in which the hub and crank pin center as well as the rim are preferably fabricated from hard annealed steel, while the associated flange and spacer webs are made from soft steel of a specific composition commonly known in the art as flange steel.

Another object is the provision of a built-up wheel in which all of the components, with the exception of the center and rim, are made of a softer steel than said center and rim, such softer steel being better suited to resist repeated shocks and loads.

A further object is to provide a drive wheel which is lighter in construction and cheaper to produce than heretofore, that will effectively resist the radial and lateral shocks and loads to which such wheels are subjected, and in which the spacer and other components connecting the center and rim together as well as to one another are so located as to ensure maximum strength while increasing the service life of the wheel.

Other objects with ancillary advantages of this invention will appear, as the nature thereof is better understood, said invention consisting substantially in the novel features of construction, arrangements and co-relation of parts, herein fully disclosed, illustrated by the accompanying drawings, wherein similar reference characters are used to designate corresponding parts throughout the several views, and then finally pointed out and specifically defined in the concluding claims.

In the drawings:

Fig. 3 is a diametric cross-section on the plane III—III of Fig. 1, but drawn to a slightly larger scale for clearer illustration of important details.

Fig. 4 is a broken side elevation, on a reduced scale, taken within the confines of the arrows IV—IV in the preceding figure.

Fig. 5 is a radial section on the plane V—V in Fig. 1.

Fig. 6 is a similar section on the plane VI—VI of the same figure.

Fig. 7 is a cross-section as viewed in the direction of the arrows VII—VII in Fig. 5.

Figure 1:
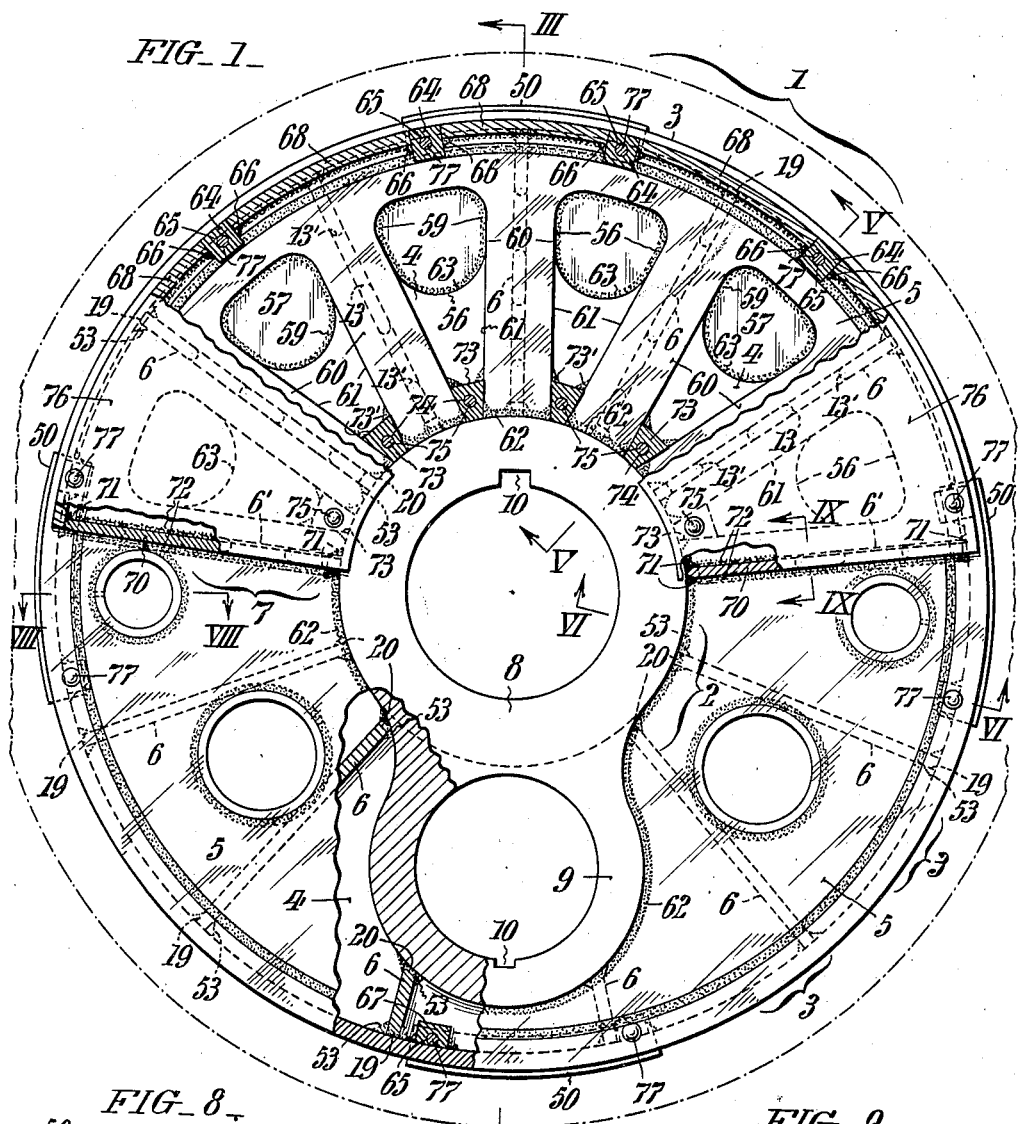
Fig. 1 is a broken side elevation of a drive wheel in accordance with this invention and having fragmentary portions removed or in section to better disclose underlying details.
Figure 8:
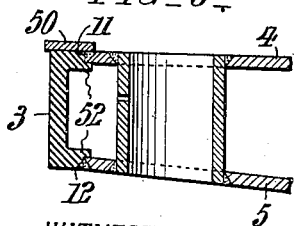
Fig. 8 is a radial section approximately on the plane VIII—VIII at the left-hand of Fig. 1; and, Fig. 9 is a cross-section on the plane IX—IX within the right-hand portion of said Fig. 1.
Figure 2:
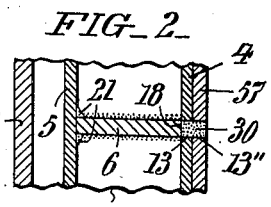
Fig. 2 is a fragmentary section, taken approximately as indicated by the plane indicating arrows II—II in Fig. 3.
Figure 9:
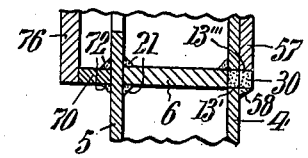

In the following detailed description of the preferred embodiment of this invention, shown by the accompanying two sheets of drawings, specific terms will be employed for the sake of clarity; but it is to be understood that such terms are used in a general sense and not for purposes of limitation.

Referring more in detail to the drawings which illustrate the instant improvements as incorporated in a locomotive main drive wheel 1, said wheel generally comprises a composite axle and crank-pin center 2; a rim 3; inner and outer or back and front discs 4, 5, respectively; radial spacers 6; and a laterally enlarged counterbalance 7. The spacers 6 preferably have the outer and inner ends 19, 20, respectively, rectangularly related with respect to the back disc 4, and the corners cut away at 23.

The composite center 2 embodies an axle hub portion 8 with an eccentrically related or crank-pin hub-section 9, each provided with a key-way 10, said center being preferably made in one piece of what is known in the art as hard annealed steel, of proper texture and strength for this part of the wheel 1, and having the axle and crank-pin hubs 8, 9 integral therewith. The rim 3 is also made of the same type of hard annealed steel, of channel cross-section, with back and front inner groovings 11, 12, respectively, for purposes later on set forth. The back 4 of the wheel 1 is preferably formed as a plate disc from "softer" grade or what is known as flange steel, while the front 5 is of corresponding flange steel but dished or shaped to shallow coniform section; while one of the discs 4, 5, preferably the former, is provided with a number of radially directed elongate slots 13, best shown in Fig. 4, conveniently arranged in aligned circumferential and equally spaced series, each series including outer and inner open end slots 13' respectively adjoining the rim 3 and composite center 2, with the intervening slot 13 medially between said rim and center as set forth in the hereinbefore referred to prior application. It is to be observed that the rim 3 has the flange portions 52 thereof inwardly directed, and that the spacers 6 have the outer parts 19 relatively reduced for butt engagement between said flange portions 52 and rim 3, welds 53 connecting said parts as well as the inner ends 20 of said spacers rigidly together and to the hub 8. In addition, the flange portion annular grooves 11, 12 serve for respective reception of the outer beveled edges of the back and front plate discs 4, 5; while the spacer edge 18 abuts the back plate 4 and the inclined edge similarly engages the front wall 5 with welds 21 securing it thereto.

The back disc 4, in addition to the radial slots 13, 13' hereinbefore mentioned, is also provided in the half-portion remote from the crank-pin hub 9 with spacer interventing openings 56, preferably of the contour shown, for a purpose later explained. These openings 56 are closed in by a segment 57, of annular plate contour, which also serves to reinforce the counterbalance 7 at the back; said segment being permanently secured to the back disc 4 by a surrounding edge weld 58, as well as having radial slots 13'', 13''', for registration with the underlying slots 13, 13', respectively, for subsequent fillage by welding material 30. Continuous inner fillet welds 59 may also be formed around the openings 56, see Figs. 1, 5 and 7, to best advantage.

The front disc 5 is formed with radial spoke portions 60, within the confines of the counterbalance 7, defined by substantially triangulate cut-outs 61 converging inwards to the axle hub-portion 8 of the composite center 2, while welds 62 unite said spoke portions 60 to the hub-portion 8. It is to be noted the back disc openings 56 spacedly register with the outer contour of the cut-outs 61 excepting their radially inward curvatures 63, which latter, however, merge into the straight sides of the cut-outs 61, as clearly seen on an inspection of Fig. 1.

The counterbalance 7 is preferably defined by and includes the spacers 6 within the half-portion of the wheel 1, remote from the crank-pin hub-portion 9; or, the widest separated radial spacers 6', within the stated limits, constitute the terminal walls of said counterbalance intermediate the discs 4, 5. The supplemental pocket or exterior portion of the counterbalance 7 is conveniently constituted by rectangular section blocks 64 having axial bores 65 and secured to the outer face of the front disc 5 by welds 66, said blocks having aligned sections 67, Fig. 7, similarly secured between the wheel rim flanges 52, with the bores 65 extended through such sections as well as said flanges. Intermediate the blocks 64 are permanently secured arcual elements 68 having their disc engaging edges beveled at 69 for reception of welding material 17, and thus forming an outer curved wall for the counterbalance 7; while the end radial spacers 6' have registering bar members 70 on the outer face of the disc 5 and secured to the adjoining arcual element ends as well as to the axle-hub 8 by corner and line welds 71, 72, respectively. In order to further strengthen and render the counterbalance 7 more rigid and effective, spacer bars 73 preferably of trapeziform cross-section with the narrower parallel side in abutment with the axle-hub 8 are employed, said bars being secured by welds 73' and being provided with longitudinal bores 74 for passage of rivets 75, designed to also permanently secure the counterbalance cover component 76 in place, while said component may also be edge welded to the axle-hub 8, as indicated at 76' in Fig. 3. Arcual strips or key members 50 are applied to the rim 3 and secured in position by rivets 77 engaged through the blocks 64, 67, back, front and cover components 4, 5 and 76, respectively.

The manner of assembling the several parts and the building-up of the wheel shown by Figs. 1–9 will, after an understanding of the preceding explanation, be self-evident to those conversant with the art, or on reference to the hereinbefore specified parent application, without specific elaboration herein. It is desired, however, to stress the fact that, with the built-up wheel 1, all shrinkage cracks are avoided, inasmuch as no cast metal is employed, the entire wheel 1, with the exception of the rim 3 and composite center 2, being made of softer steel, said wheel is better suited to resist repeated shocks and loads applied both radially and laterally in service and, finally, the wheel herein disclosed is considerably lighter in weight and cheaper to produce than cast steel corresponding wheels.

While for purposes of properly disclosing the invention a practical embodiment thereof has been explained in detail, it is to be understood the same is to be considered in an illustrative sense, and that the invention is not to be limited thereto except as defined by the following claims.

Having thus described my invention, I claim:

1. In a built-up driving wheel for locomotives a hub and crank pin center; a rim; intervening front and back plate discs; radial reinforcing webs in connected abutment between said discs, rim and center; a main counterbalance pocket in the half-portion of the wheel remote from the crank pin section; an outer conformatory supplemental counterbalance pocket; means affording communication between the main and supplemental counterbalance pockets; means jointly bracing the counterbalance main and supplemental pockets comprising outer axially-bored elements of approximately quadrilateral cross-section and inner similarly-bored elements of corresponding cross-section, located between the radial webs, and respectively attached to the wheel rim and hub portions; and individual means through the said elements for rigidly connecting them to the counterbalance structure.

2. A built-up locomotive driving wheel as defined in claim 1, wherein the counterweight pocket is formed by an approximately half-segment of the rim and a chord-plate extended between the ends of said segment, and said chord-plate intersects several of the radial reinforcing webs.

3. A built-up locomotive driving wheel as defined in claim 1, wherein the counterweight pocket has a lateral extension to one side of the wheel, said extension being formed by supplemental arcuate rim and chord plates welded to the disc at the aforesaid side of the wheel, and a removable cover plate is secured to the supplemental arcuate and chord plates, by the associated bracing element individual connector means, whereby accurate adjustment of the counterbalance is positively obtainable.

4. A locomotive wheel according to claim 1, wherein the radial reinforcing webs are uniformly spaced circumferentially around the wheel, and the bracing elements are medially located between said webs.

HARRY A. HOKE.